US008645634B1

(12) United States Patent
Cox et al.

(10) Patent No.: US 8,645,634 B1
(45) Date of Patent: Feb. 4, 2014

(54) ZERO-COPY DATA SHARING BY COOPERATING ASYMMETRIC COPROCESSORS

(75) Inventors: Michael Brian Cox, Menlo Park, CA (US); Nicholas Patrick Wilt, Rochester, NY (US); Richard Hough, Ithaca, NY (US)

(73) Assignee: NVIDIA Corporation, Santa Clara, CA (US)

( * ) Notice: Subject to any disclaimer, the term of this patent is extended or adjusted under 35 U.S.C. 154(b) by 948 days.

(21) Appl. No.: 12/355,648

(22) Filed: Jan. 16, 2009

(51) Int. Cl.
*G06F 13/00* (2006.01)
*G06F 13/28* (2006.01)

(52) U.S. Cl.
USPC ............ 711/147; 711/E12.013; 711/E12.066; 712/31

(58) Field of Classification Search
USPC ........... 711/147, E12.013, E12.066; 709/213, 709/215, 216; 712/31
See application file for complete search history.

(56) References Cited

U.S. PATENT DOCUMENTS

| 5,706,478 | A | * | 1/1998 | Dye ............................. 345/503 |
| 6,684,305 | B1 | * | 1/2004 | Deneau ......................... 711/159 |
| 2002/0062352 | A1 | * | 5/2002 | Asano et al. .................. 709/212 |
| 2002/0161452 | A1 | * | 10/2002 | Peltier ............................. 700/2 |
| 2002/0199075 | A1 | * | 12/2002 | Jacobs ........................... 711/163 |
| 2007/0226450 | A1 | * | 9/2007 | Engbersen et al. ........... 711/203 |
| 2007/0250681 | A1 | * | 10/2007 | Horvath et al. ................... 712/4 |
| 2008/0120474 | A1 | * | 5/2008 | Hastings et al. .............. 711/147 |
| 2008/0222369 | A1 | * | 9/2008 | Jeong ............................ 711/153 |
| 2009/0307464 | A1 | * | 12/2009 | Steinberg et al. ............... 712/31 |
| 2012/0016502 | A1 | * | 1/2012 | Sharma et al. .................. 700/94 |

FOREIGN PATENT DOCUMENTS

| WO | WO 2008/127610 | 10/2008 |
| WO | WO 2008/127622 | 10/2008 |
| WO | WO 2008/127623 | 10/2008 |

OTHER PUBLICATIONS

Moss, et al. "Toward Acceleration of RSA Using 3D Graphics Hardware," LNCS 4887, Dec. 2007, pp. 369-388.
Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner* — Edward Dudek, Jr.
(74) *Attorney, Agent, or Firm* — Patterson + Sheridan, L.L.P.

(57) ABSTRACT

One embodiment of the present invention sets forth a technique for reducing the copying of data between memory allocated to a primary processor and a coprocessor is disclosed. The system memory is aliased as device memory to allow the coprocessor and the primary processor to share the same portion of memory. Either device may write and/or read the shared portion of memory to transfer data between the devices rather than copying data from a portion of memory that is only accessible by one device to a different portion of memory that is only accessible by the other device. Removal of the need for explicit primary processor memory to coprocessor memory and coprocessor memory to primary processor memory copies improves the performance of the application and reduces physical memory requirements for the application since one portion of memory is shared rather than allocating separate private portions of memory.

20 Claims, 14 Drawing Sheets

ZERO-COPY DATA SHARING BY COOPERATING ASYMMETRIC COPROCESSORS

BACKGROUND OF THE INVENTION

1. Field of the Invention

The present invention generally relates to memory allocation and access and more specifically to sharing of memory by cooperating asymmetric coprocessors.

2. Description of the Related Art

Typical parallel processing subsystems include at least one parallel processing unit (PPU) that may be configured to beneficially provide a high volume of computational throughput that is impractical to achieve with a single processing unit, such as a conventional central processing unit (CPU). The PPU acts as a coprocessor to a CPU and may be configured to incorporate a plurality of processing cores, each capable of executing one or more instance of a parallel program on a plurality of processing engines, which collectively provide the high computational throughput. The PPU may be further configured to include one or more local memory subsystems, such as an external dynamic random access (DRAM) memory subsystem that is locally attached to the PPU and is locally controlled by the PPU.

In a typical scenario, a user application may employ a CPU and the PPU to each perform a portion of the computations required by the user application. The PPU commonly performs high volume computations, while the CPU performs more complex operations as well as over all housekeeping for the user application. The user application conventionally includes one or more CPU threads executing on a CPU, and a plurality of threads executing on one or more processing cores within the PPU that perform computations for the CPU threads. During the normal course of execution, the CPU threads generate data to be processed by the PPU and the PPU generates data to be stored, viewed by a user, or processed further by the CPU threads. For example, the CPU threads may receive image data from a video camera and transmit the image data to the PPU for processing. The PPU may then perform simple, but computationally intensive processing on the image data to generate a data set to be transmitted back to the CPU for more complex analysis. The data set may include candidate regions for edge detection, candidate regions for motion detection, or any other image features useful to the user application. In certain applications, the image data is being processed into the data set in real time and the latency associated with transferring the data set to the CPU is critical to overall system performance.

Conventional PPU systems typically provide a mechanism for mapping pages of the local PPU memory into a virtual address space associated with the CPU threads, enabling efficient data access of local PPU memory by CPU threads. Mapping the local PPU memory into the application space of a CPU thread, for example, allows the CPU threads to compose and efficiently transmit image data to the PPU for processing. In applications where data primarily flows from the CPU to the PPU, this mapping provides an acceptable performance optimization. However, in applications where PPU threads are composing and transmitting data to system memory associated with the CPU, this mapping is frequently inefficient because data bound for the CPU thread needs to be copied at least once while in transit. For example, when the PPU processes image data, the resulting data set must be generated in PPU memory because the PPU memory is the only virtual address space known to the PPU threads. Once complete, the data set may be copied to system memory, introducing inefficiencies by introducing additional processing latency.

The PPU memory is allocated to the PPU while all other memory in the system is referred to as host memory. This abstraction model allows for code portability across multiple memory configurations. For example, when NVIDIA's CUDA™ (Compute Unified Device Architecture) programming model is used, DRAM resident on a graphics card including a discrete graphics processing unit (GPU) that is configured as a coprocessor is the PPU memory and the system memory is the host memory. When an integrated GPU that does not include device memory is configured as a coprocessor, one portion of the system memory is designated as PPU memory for exclusive use by the PPU and is effectively removed from the system memory.

In a typical design paradigm, a CUDA™ application can be divided into three primary steps. During the initialization step the program first allocates buffers in both host and PPU memory and then begins copying inputs from host memory to PPU memory. Once the inputs have been successfully copied, the compute phase begins processing the input data using highly parallel algorithms on the GPU. After computation step has completed, the teardown step copies the resultants from PPU memory to host memory and presents the resultants to the application. Depending on the application, this copy-compute-copy cycle may repeat multiple times over the course of a single run. Optimizing this cycle is a major point of application tuning for most CUDA™ programs, as due to memory and interconnect bandwidths and latencies the copies of data to and from the compute device can frequently dominate the application runtime.

Accordingly, what is needed in the art is a system and method for reducing copying of data between memory allocated to the CPU and the PPU.

SUMMARY OF THE INVENTION

Various embodiments of a method of the invention for sharing a portion of a physical memory include allocating the portion of the physical memory as a shared memory that is configured for use by a first coprocessor and a second coprocessor, where the first coprocessor and the second coprocessor are asymmetric processors. A second portion of the physical memory is allocated as a private memory that is configured for use only by the first coprocessor. Input data is prepared by an application program that is executed by the first coprocessor and the input data is stored only in the shared memory. The input data is read from the shared memory by the second coprocessor and processed by the second coprocessor to produce output data that is stored in the shared memory by the second coprocessor.

One advantage of the disclosed method is that it reduces copying of data between memory allocated to the first coprocessor and the second coprocessor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
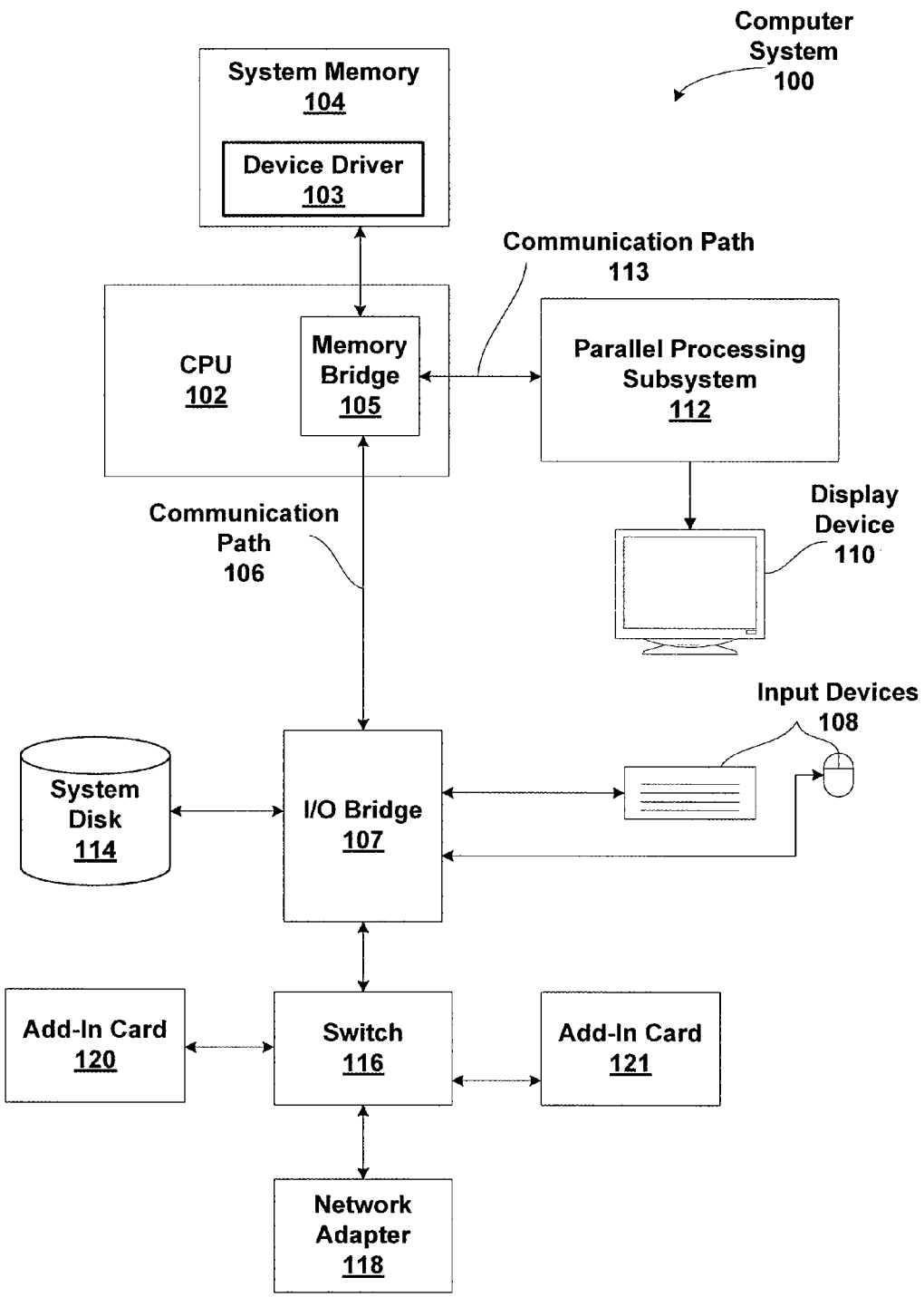
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to from a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
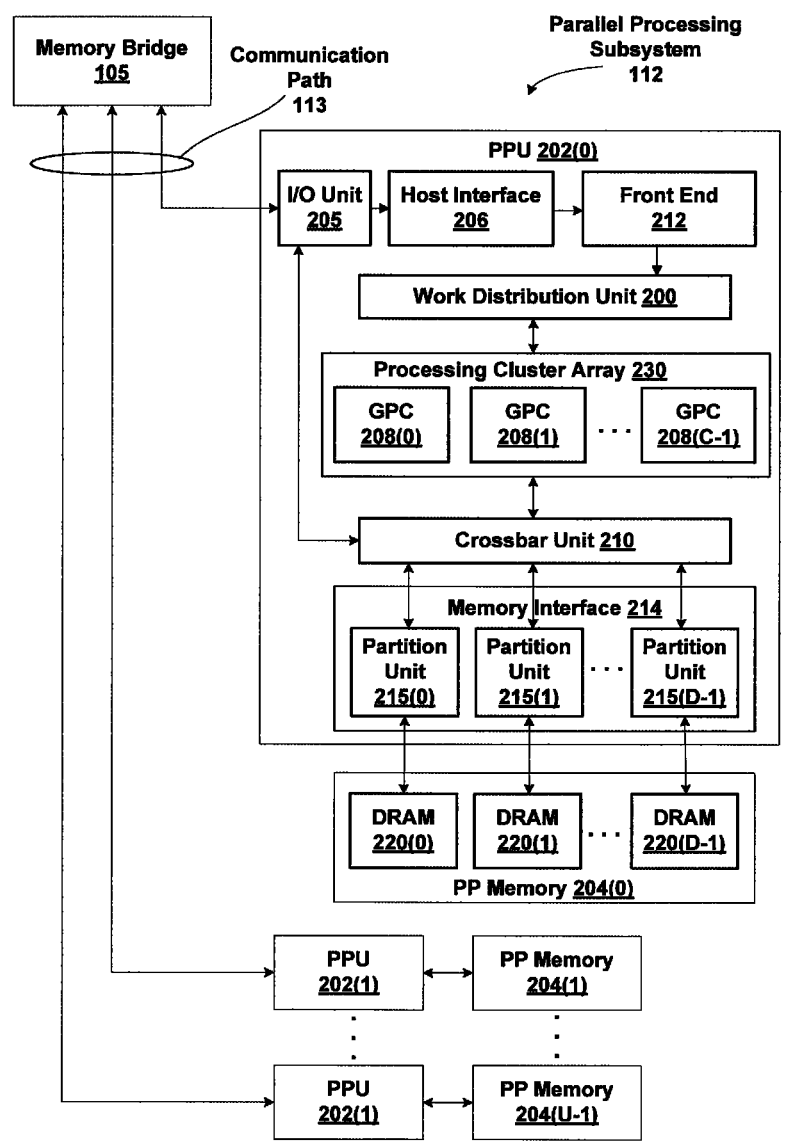
FIG. 2 illustrates a parallel processing subsystem, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Memory interface 214 may be partitioned into a number D of memory partition units that are each coupled to a portion of parallel processing memory 204, where D≥1. Each portion of parallel processing memory 204 generally includes one or more memory devices (e.g. DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112. When the system memory 104 is mapped as device memory through the use of virtual addresses, PPUs 202 and CPU 102 can share a portion of system memory 104 or PP memory 204, as described further herein.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and from factors, including desktop, laptop, or handheld personal computers, servers, workstations, game consoles, embedded systems, and the like.

Persons skilled in the art will understand that the architecture described in FIGS. 1 and 2 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Core Overview

Figure 3A:
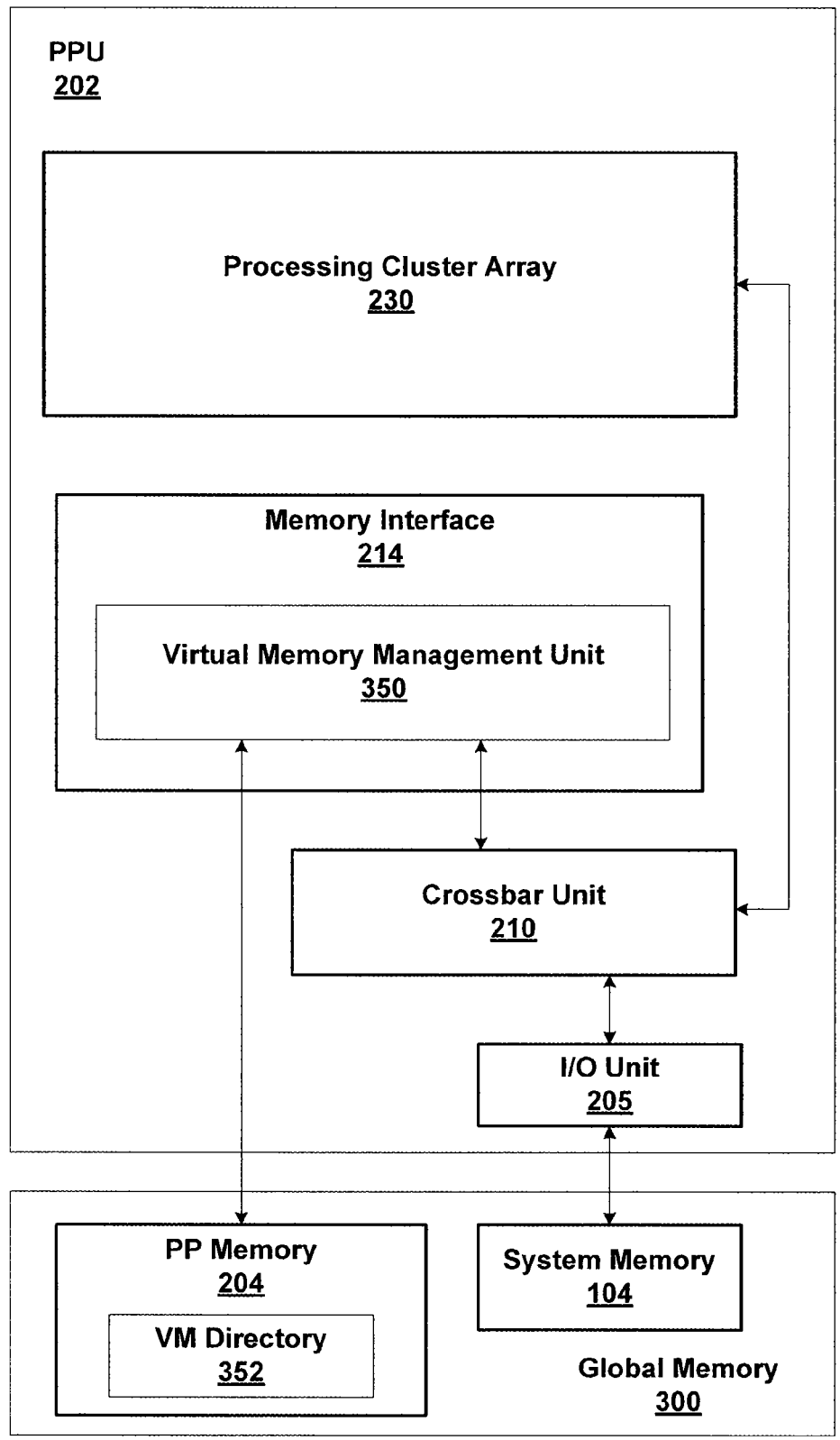
FIG. 3A is a block diagram of a parallel processing unit for the parallel processing subsystem of FIG. 2, in accordance with one or more aspects of the present invention.

FIG. 3A is a block diagram of a parallel processing unit 220 for the parallel processing subsystem 112 of FIG. 2, in accordance with one or more aspects of the present invention. In one embodiment, each processing cluster array 230 includes an array of P (e.g., 8, 16, etc.) GPCs 208 that are configured to receive SIMT instructions from a single instruction unit. Each GPC 208 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

In some embodiments, multithreaded processing processing cluster array 230 of FIG. 3A can execute general-purpose computations using thread blocks or thread arrays. A thread array consists of a number (n0) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are arranged as "cooperative thread arrays," or CTAs. Each CTA is a group of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set or produces one portion of the output data set. A CTA program can implement algorithms using a wide range of mathematical and logical operations, and the program can include conditional or branching execution paths and direct and/or indirect memory access.

Each processing engine in a GPC 208 uses space in a local register file (LRF) for storing its local input data, intermediate results, and the like. Each processing engine also has access to an on-chip shared memory that is shared among all of the GPCs 208 in processing cluster array 230. The processing engines also have access via memory interface 214 to off-chip "global" memory 300, which can include, e.g., PP memory 204 and/or system memory 104, with system memory 104 being accessible by memory interface 214 via crossbar unit 210 and I/O unit 205, as described above. It is to be understood that any memory external to PPU 202 may be used as global memory 300.

The memory interface 214 includes a virtual memory management unit 350 configured to map virtual addresses to physical addresses. The virtual addresses are associated with threads executing on a processing cluster array 230. Each virtual address maps to a page of memory that resides in either the PP memory 204 or system memory 104. A virtual memory directory 352 is located in PP memory 204, and includes data structures used to map virtual addresses to physical addresses. Each page of memory within a virtual address space has an associated page table entry (PTE) that includes, without limitation, a physical location (PL) bit. The PL bit determines whether the requested memory page resides in either the PP memory 204 or system memory 104.

Persons skilled in the art will understand that the architecture described in FIGS. 1, 2 and 3A in no way limits the scope of the present invention and that the techniques taught herein may be implemented on any properly configured processing unit, including, without limitation, one or more CPUs, one or more multi-core CPUs, one or more PPUs, one or more multi-core PPUs, or the like, without departing the scope of the present invention.

Mapping Memory Across Asymmetric Coprocessors

Figure 3B:
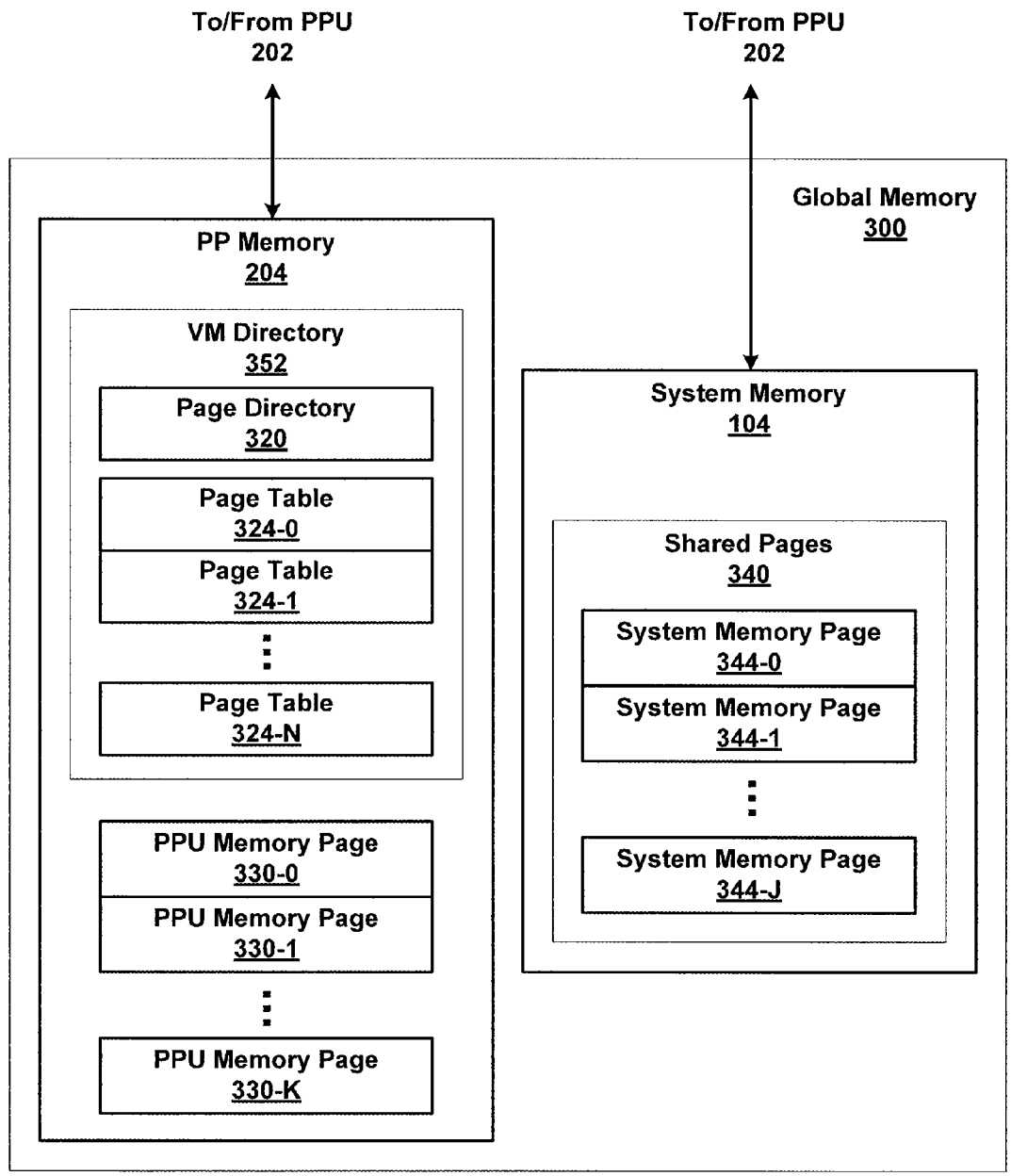
FIG. 3B illustrates memory data structures for virtual address operations in parallel processor memory and system memory, in accordance with one or more aspects of the present invention.

FIG. 3B illustrates memory data structures for virtual address operations in parallel processor memory and system memory, in accordance with one or more aspects of the present invention. The PP memory 204 includes the VM directory 352 and a plurality of PPU memory pages 330. The VM directory 352 includes a page directory 320 and a plurality of page tables 324. The system memory 104 includes a plurality of memory pages, some of which are shared pages 340. The shared pages 340 include system memory pages 344, which should be locked in normal operation. For example, an operating system executing on the CPU 102 of FIG. 1 may lock the system memory pages 344, thereby avoiding a re-mapping of a system memory page 344 by the operating system, which might corrupt virtual to physical mapping information stored in the VM directory 352.

The crossbar unit 210 transmits memory access requests from clients within the PPU 202 of FIG. 2 to the memory interface 214. If a memory access request is a virtual memory access request, then the request is directed to the virtual memory management unit 350. The virtual memory management unit 350 uses virtual to physical mapping information in the VM directory 352 to map a virtual address associated with the virtual memory access request to a physical memory address located in either the PP memory 204 or system memory 104. If the location of the physical memory address is in PP memory 204, then the access request is dispatched to PP memory 204. If the location of the physical memory address is in system memory 104, then the access request is dispatched to system memory 104 via the crossbar unit 210 and I/O unit 205.

Data in both PP memory 204 and system memory 104 is structured as pages of memory. Any page size (measured in bytes per page) may be used. Furthermore, each memory page is aligned along address boundaries of the page size, starting at address zero. In one embodiment, each PP memory page 330 includes 4096 bytes of data and each system memory page 344 includes 4096 bytes of data.

The page directory 320 includes a plurality of page directory entries. Each page directory entry (PDE) references a page table 324. Each page table 324 typically includes a plurality of page table entries. Each page table entry (PTE) references a page of physical memory in either the PP memory 204 or the system memory 104.

Persons skilled in the art will understand that the specific virtual to physical mapping technique described in FIG. 3B in no way limits the scope of the present invention and that the techniques taught herein may be implemented on any properly configured parallel processing unit, including, without limitation, one or more parallel processing units (PPUs), one or more multi-core PPUs, or the like, without departing from the scope of the present invention.

Figure 3C:
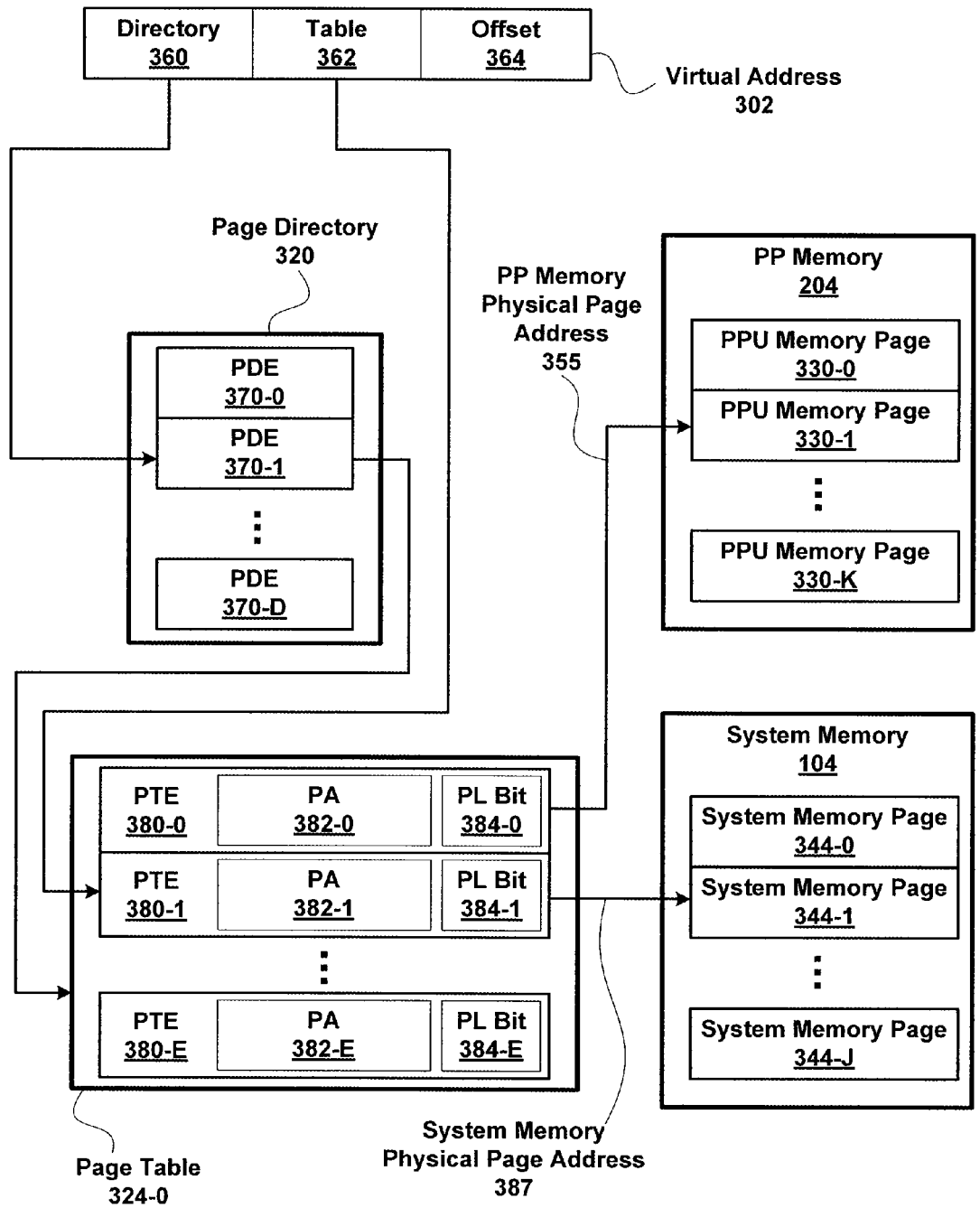
FIG. 3C illustrates a two-stage mapping from a virtual address to a physical address using a physical location bit within a page table entry, in accordance with one or more aspects of the present invention.

FIG. 3C illustrates a two-stage mapping from a virtual address 302 to a physical address using a physical location bit (PL bit) 384 within a page table entry 380, in accordance with one or more aspects of the present invention. In one embodiment, a two-stage virtual to physical mapping is used. In this embodiment, the virtual address 302 is partitioned into three fields of address bits. The most significant set of bits is designated the directory 360. The next most significant set of bits is designated the table 362. The least significant set of bits is designated the offset 364.

The virtual to physical address mapping begins with a lookup within the page directory 320. The directory 360 field indexes into a specific PDE 370, which stores an index value used to point to a specific page table 324-0. In this example, PDE 370-1 is selected by the value of the directory 360 field and the value stored in PDE 370-1 field points to page table 324-0. The value of the table 362 field indexes into a specific PTE 380. In this example PTE 380-1 is selected by the table 362 field.

Each PTE 380 includes, without limitation, a field used to store a physical address (PA) 382 and a physical location bit (PL bit) 384. The state of the PL bit 384 determines whether the requested virtual address resides in the PP memory 204 or the system memory 104. If the PL bit 384 of a given PTE 380 indicates the requested virtual address page resides in the PP memory 204, then the PA 382 field of that PTE 380 is the PP memory physical page address 355 of the associated PPU memory page 330. Furthermore, an address match to the given PTE 380 causes the memory access request to be directed to the PP memory 204. If, instead, the PL bit 384 of a given PTE 380 indicates the requested virtual address page resides in system memory 104, then the PA 382 field of that PTE 380 is the system memory physical page address 387 of the associated system memory page 344. Furthermore, an address match to the given PTE 380 causes the memory access request to be directed to the system memory 104. A given physical page address only provides address granularity of a memory page. The complete physical address of the mapped virtual address 302 includes the offset 364 field, which provides byte-level address granularity. The virtual memory management unit 350 may improve performance by caching some or all of the page directory 320, page tables 324, and PTEs 380.

Persons skilled in the art will recognize that in certain embodiments, the CPU 102 may need to synchronize access to shared system memory pages with the parallel processing subsystem 112. For example, the CPU 102 may include an on-chip memory cache, which allows the CPU 102 to perform read and write operations to the memory cache instead of accessing system memory 104. At some point, a cache replacement policy requires the CPU 102 to write data stored in the memory cache to system memory 104. Prior to such a write, however, the most recent version of data in the memory cache may significantly diverge from "stale" data in system memory. If the PPU 202 attempts to access stale data in system memory, the PPU 202 may generate erroneous results using the stale data. Furthermore, the PPU 202 may include a similar caching mechanism, potentially leading to a similar situation with the CPU 102 accessing stale data in system memory. To avoid the CPU 102 and the PPU 202 from using stale data residing in system memory, a synchronization system should be employed.

In one embodiment, synchronization of each memory page is implemented though a concept of ownership of each page. Before a memory page is accessed, the accessing device secures exclusive access (ownership) to the memory page from any other devices. Additionally, before a memory page is released from ownership, all pending writes to the memory page are completed. In this way, each memory page is temporarily assigned to one device for exclusive access. The memory page may be re-assigned as needed by the CPU 102 or PPU 204. Any technically feasible technique may be used to communicate ownership of memory blocks between appropriate virtual memory management subsystems. In still other embodiments of the present invention, the system memory 104 is coherent, and requests from PPU 202 to system memory 104 may snoop the on-chip memory cache in CPU 102. Similarly, requests from the CPU 102 to system memory 104 may snoop an on-chip memory cache in PPU 202.

Figure 4:
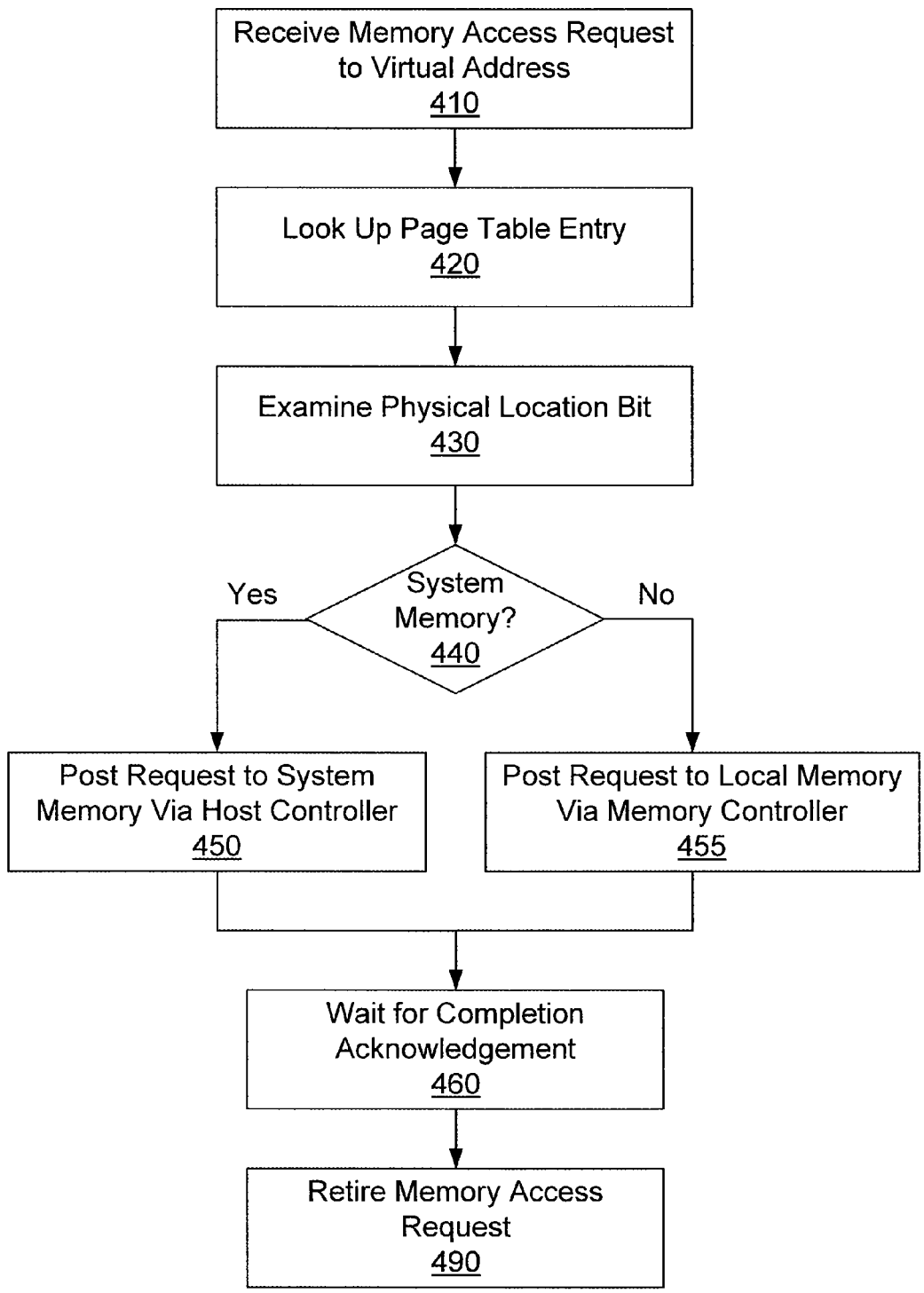
FIG. 4 is a flow diagram of method steps for performing a virtual address to physical address mapping, based on a physical location bit, according to one embodiment of the invention.

FIG. 4 is a flow diagram of method steps for performing a virtual address to physical address mapping, based on a physical location bit, according to one embodiment of the invention. Although the method steps are described in conjunction with the systems of FIGS. 1, 2, 3A, 3B, and 3C, persons skilled in the art will understand that any system configured to perform the method steps, in any order, is within the scope of the invention.

The method begins in step 410, where the virtual memory management unit 350 receives a memory access request to a virtual address. In step 420, the virtual memory management unit 350 looks up a corresponding page table entry, which includes a physical address field and a physical location bit. In step 430, the virtual memory management unit 350 examines the physical location bit to determine whether the page table entry references a physical memory page stored in PPU memory 204 or system memory 104. If, in step 440, the physical location bit indicates that the page table entry references a page in system memory, then the method proceeds to step 450, where the virtual memory management unit 350 posts a corresponding memory access request to system memory via a host controller. In step 460, the virtual memory management unit 350 waits for a completion acknowledgement of the memory access request. The method terminates in step 490, where the virtual memory management unit 350 retires the memory access request.

Returning to step 440, if the physical location bit indicates that the page table entry references a page that is not in system memory, then the method proceeds to step 455, where the virtual memory management unit 350 posts a corresponding memory access request to local memory controller. The method then proceeds to step 460.

In sum, a technique for mapping system memory into a virtual address space used by a parallel processing unit thread within a parallel processing unit is disclosed. A virtual memory management unit 350, within the parallel processing unit, performs a virtual to physical mapping function using mapping data stored in a virtual memory directory 352. The virtual memory directory 352 includes at least one page directory, and at least one page table, which includes a plurality of page table entries. Each page table entry includes a physical address and a physical location bit. The physical address is a page aligned physical address. When a virtual memory access request is posted to the virtual memory management unit 350, the virtual to physical mapping function retrieves a page table entry 380 and examines the associated physical location bit 384. The value of the physical location bit determines whether the requested memory page (and therefore the page aligned physical address) resides within parallel processor memory 204 or system memory 104.

Zero-Copy Data Sharing

A PPU 202 that is configured to access a portion of memory as a virtual address space that is shared with CPU 102 may be used to perform zero-copy data sharing. In a conventional system, copy operations are needed to transfer data between different portions of memory, such as system memory that is allocated to a primary processor and memory that is dedicated to a coprocessor, such as PPU 202. In some conventional systems, the CPU is configured to write data to a memory-mapped register space of a coprocessor to transfer data to the coprocessor. CPU 102 and PPU 202 are asymmetric coprocessors since the CPU 102 may include one or more cores, each of which is a sequential processing engine that is configured to run the operating system and offload tasks to other devices. The PPU 202 is configured to perform functional processing that is offloaded by the CPU 102. The PPU 202 may be configured to incorporate a plurality of processing cores, each capable of executing one or more instance of a parallel program on a plurality of processing engines, which collectively provide the high computational throughput. The PPU 202 may also include dedicated circuitry for performing high precision computations.

Figure 5A:
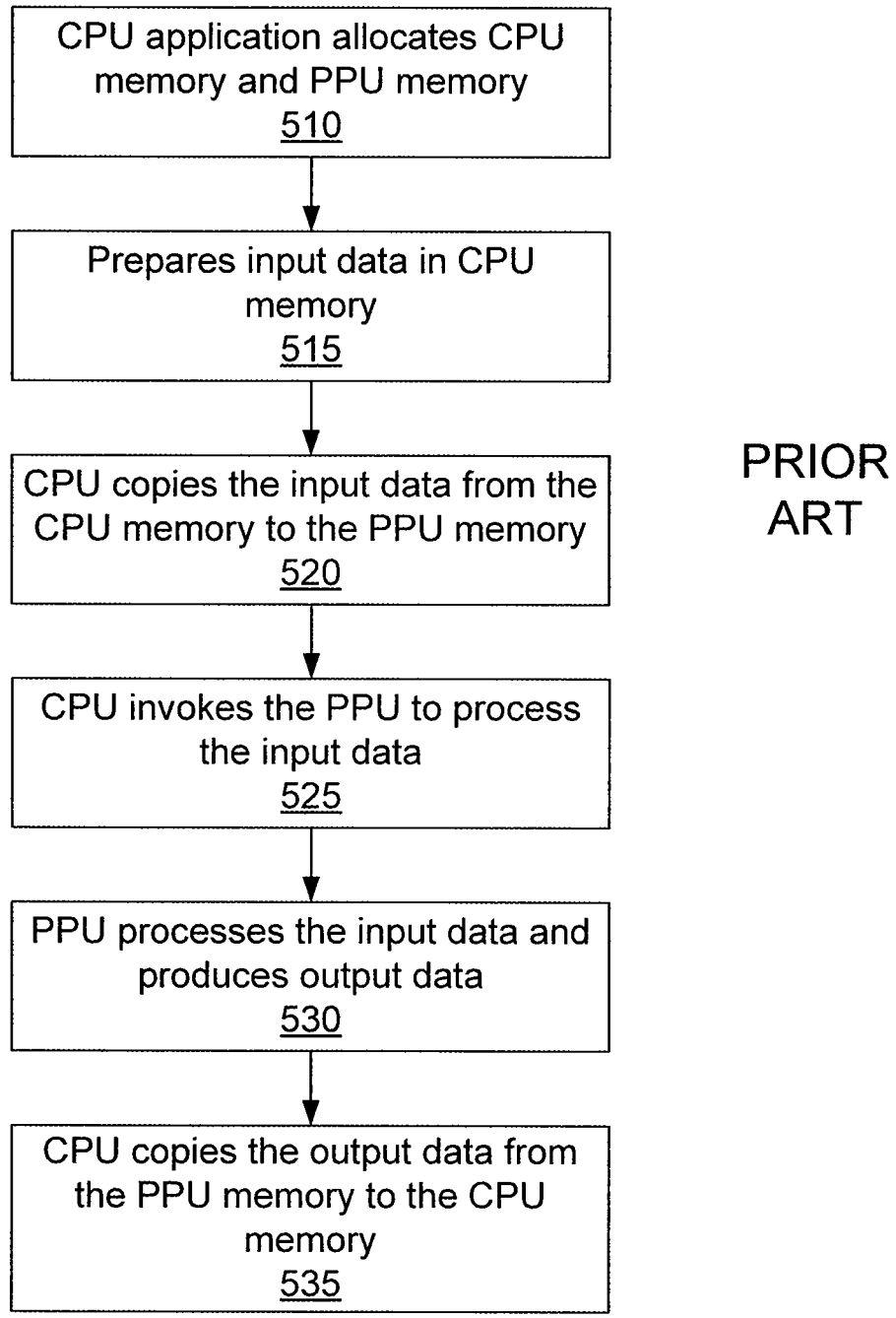
FIG. 5A is a flow diagram of prior art method steps for sharing data between a CPU and PPU using copy operations.

FIG. 5A is a flow diagram of prior art method steps for sharing data between a CPU and PPU using copy operations. In step 510 an application running on the CPU (primary processor) allocates memory only for use by the CPU in a first portion of system memory and allocates memory only for use by the PPU (coprocessor) in a second portion of system memory, where the first portion excludes all of the second portion. In step 515 the application prepares input data in the first portion of the system memory. In step 520 the CPU initiates copying of or copies the input data from the first portion of the system memory to the second portion of the system memory. In step 525 the CPU invokes the PPU to process the input data. In step 530 the PPU processes the input data, reading the input data from the second portion of the system memory, and produces output data that is written to the second portion of the system memory. In step 525 the CPU initiates copying of or copies the output data from the second portion of the system memory to the first portion of the system memory. The CPU may then process the output data.

The transferring of data between the first and second portions of the global memory may occur several times within a given application. The transfers may involve small or large amounts of data and the time between transfers may be long or short. Steps 520 and 535 may be eliminated to improve performance and reduce the physical memory requirements when a PPU is configured to access the same physical memory as a shared memory. As previously explained in conjunction with FIGS. 1, 2, 3A, 3B, 3C, and 4, PPU 202 may be configured to translate from PPU-virtual addresses to physical addresses in system memory 104. Conventional CPUs are typically capable of translating from CPU-virtual address to physical addresses in system memory.

Figure 5B:
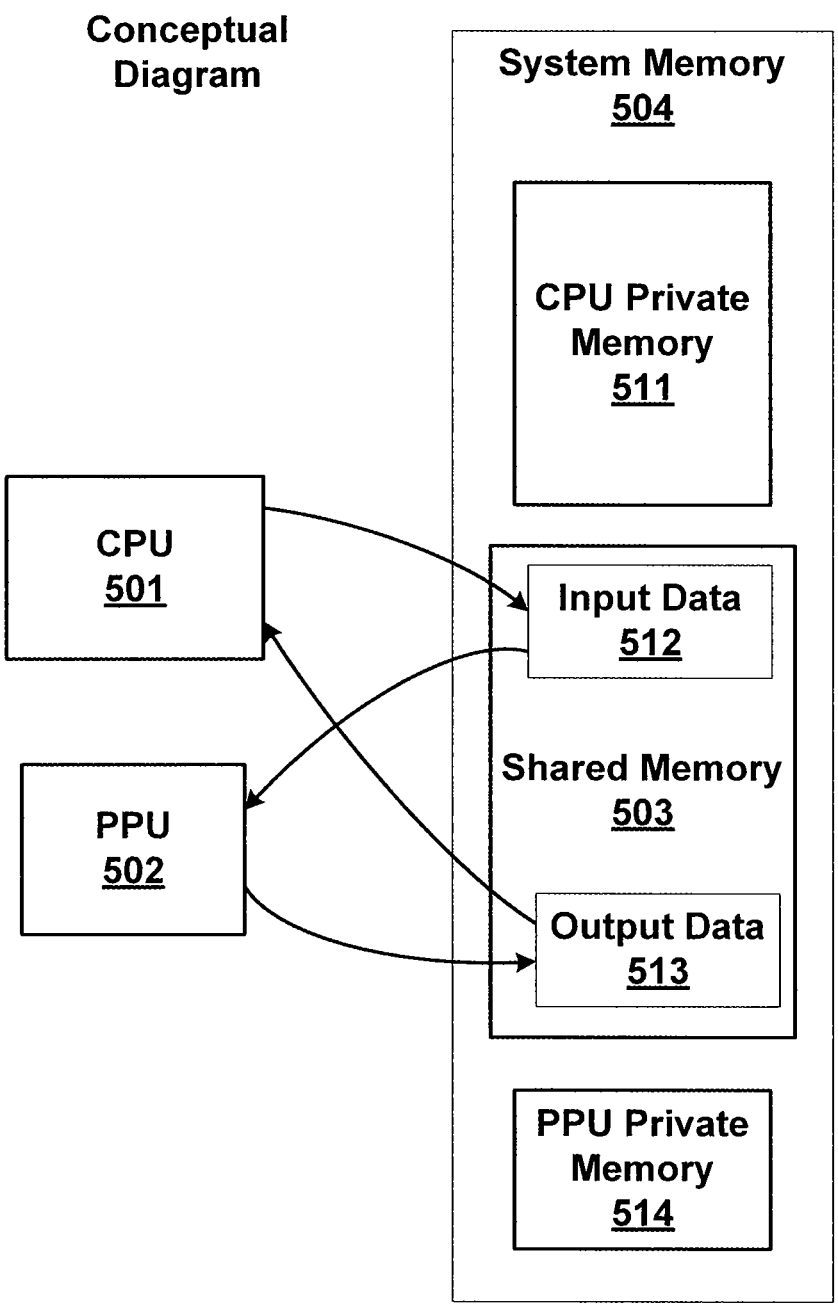
FIG. 5B is a conceptual diagram illustrating accesses of the shared memory by the CPU and PPU, in accordance with one or more aspects of the present invention.

FIG. 5B is a conceptual diagram illustrating accesses of the shared memory by a CPU 501 and a PPU 502, in accordance with one or more aspects of the present invention. A system that includes asymmetric processors CPU 501 and PPU 502 runs an operating system and one or more application programs on the CPU 501 while offloading computation tasks to the PPU 502. PPU 502 may be a coprocessor that is configured to perform graphics processing tasks.

A first portion of a system memory 504, CPU private memory 511 may be explicitly allocated for use only by CPU 501. A second portion of system memory 504, PPU private memory 514 may be explicitly allocated for use only by PPU 502. In contrast with conventional systems, a third portion of system memory 504, shared memory 603, is explicitly allocated for use by both CPU 501 and PPU 502. CPU 501 and PPU 502 may both read and write shared memory 603 directly, i.e., without transferring the data that is read from or written to shared memory 603 through a DMA engine.

The application processing is performed by a combination of CPU 501 and PPU 502 functioning as asymmetric coprocessors. CPU 501 may initiate processing of input data stored in shared memory 503 by PPU 502 and PPU 502 may initiate processing of data in shared memory 503 by CPU 501. For example, CPU 501 may process and store the input data 512 in shared memory 503. PPU 502 may then read and process the input data 512 and store the output data 513 in the shared memory 503. CPU 510 may read output data 513 from the shared memory 503 and perform further processing on the output data 513.

The application processing performance may be improved since time is not spent copying the input data 512 and output data 513 between CPU private memory 511 and PPU private memory 514. Additionally, memory bandwidth is conserved by reducing the copying of the input data 512 and the output data 513 between CPU private memory 511 and PPU private memory 514. Physical memory space may also be conserved since the input data 512 and the output data 513 is only stored in shared memory 503 instead of being stored in both CPU private memory 511 and PPU private memory 514.

Persons skilled in the art will recognize that in certain embodiments, the CPU 501 and PPU 502 may need to synchronize access to shared system memory pages in shared memory 503. As previously explained, the CPU 501 may include an on-chip memory cache, which allows the CPU 501 to perform read and write operations to the memory cache instead of accessing shared memory 503. To avoid the CPU 501 and the PPU 502 from using stale data residing in shared memory 503, a synchronization system should be employed. Additionally, before a memory page is released for access by another processor, all pending writes to the memory page are completed. In still other embodiments of the present invention, shared memory 503 is coherent, and requests from PPU 502 to system memory 504 may snoop the on-chip memory cache in CPU 501. Similarly, requests from the CPU 501 to system memory 504 may snoop an on-chip memory cache in PPU 502.

Figure 5C:
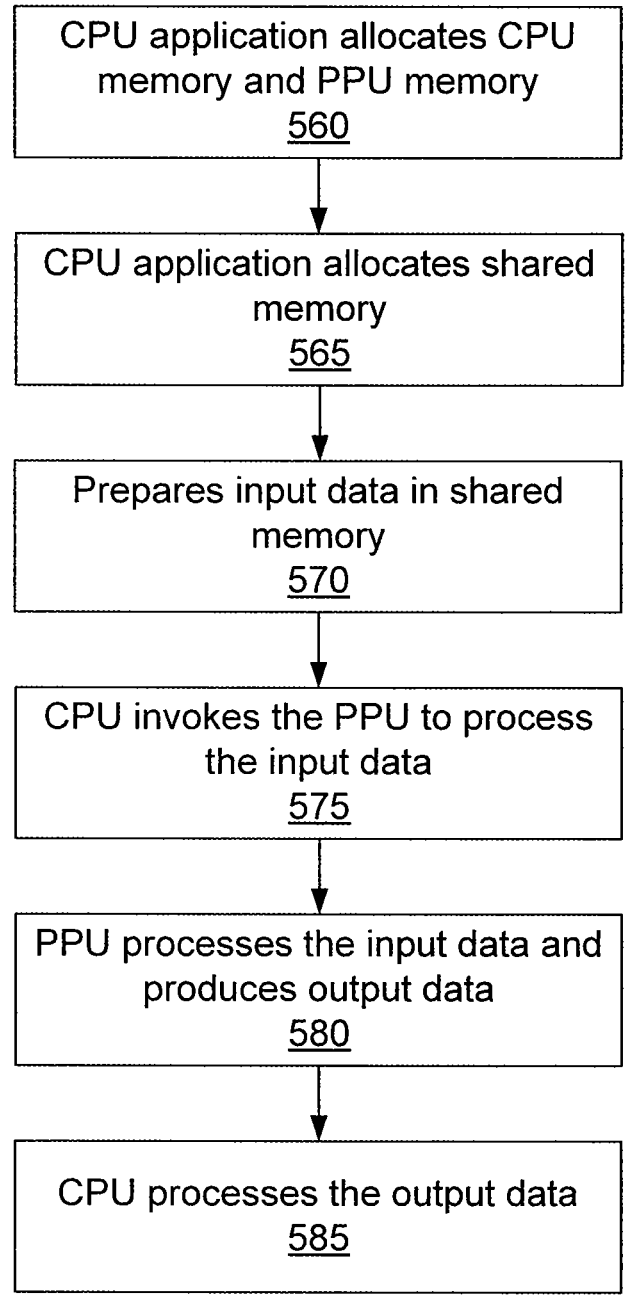
FIG. 5C is a flow diagram of method steps for performing processing of data using a CPU and PPU without using copy operations, according to one embodiment of the invention.

FIG. 5C is a flow diagram of method steps for performing processing of data using a CPU 501 and PPU 502 without using copy operations, according to one embodiment of the invention. Although the method steps are described in conjunction with the systems of FIGS. 1, 2, 3A, 3B, 3C, and 6A through 6E, persons skilled in the art will understand that any system configured to perform the method steps, in any order, is within the scope of the invention.

In step 560 an application running on the CPU 501 (primary processor) allocates CPU private memory 511 only for use by the CPU 501 in a first portion of system memory 504 and allocates PPU private memory 514 only for use by the PPU 502 (coprocessor) in a second portion of system memory 504, where the first portion excludes all of the second portion. In step 565 the application allocates shared memory 503 for use by the CPU 501 and the PPU 502. In step 570 the application prepares input data 512 in the shared memory 503. In step 575 the CPU 501 invokes the PPU 502 to process the input data 512. In step 580 the PPU 502 processes the input data 512, reading the input data 512 from the shared memory 503, and produces the output data 513 that is also written to the shared memory 503. In step 585 the CPU 501 may read and/or process the output data 513.

In other embodiments of the invention, the PPU 502 may be configured to offload processing to, or initiating processing by the CPU 501. In such a system, the PPU 502 invokes the CPU 501 to process the input data 512 and the CPU 501 processes the input data 512, reading the input data 512 from the shared memory 503. The CPU 501 produces the output data 513, writing the output data 513 in the shared memory 503. The PPU 502 may then read and/or process the output data 513. In still other embodiments of the invention, shared memory is allocated in global memory 300 and/or PP memory 204. For example, when input data 512 is small compared with output data 513 and PPU 502 is configured to produce output data 513, it may be advantageous to allocate a shared memory in PP memory 204.

Figure 6A:
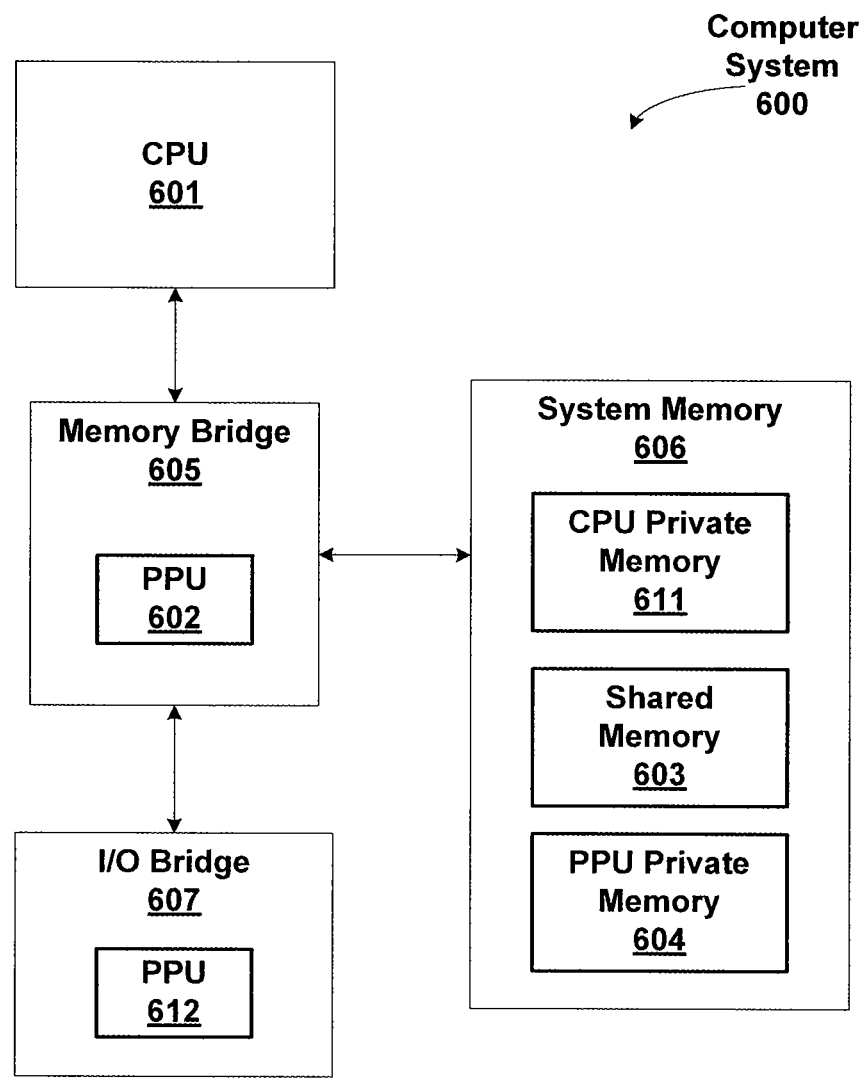
FIGS. 6A, 6B, 6C, 6D, and 6E are block diagrams illustrating various computer systems configured to implement one or more aspects of the present invention.

FIG. 6A is a block diagram illustrating a computer system 600 that includes the CPU 601 and system memory 606, and is configured to implement one or more aspects of the present invention. A PPU 602 is integrated into a memory bridge 605. Alternatively, or additionally, a PPU 612 is integrated into an I/O bridge 607. A first portion of a system memory 606, CPU private memory 611 may be explicitly allocated for use only by a CPU 601. A second portion of system memory 606, PPU private memory 604 may be explicitly allocated for use only by PPU 602 and/or PPU 612. In contrast with conventional systems, a third portion of system memory 606, shared memory 603, is explicitly allocated for shared use by CPU 601, PPU 602, and/or PPU 612. CPU 601 and PPU 502 may both read and write shared memory 603.

Figure 6B:
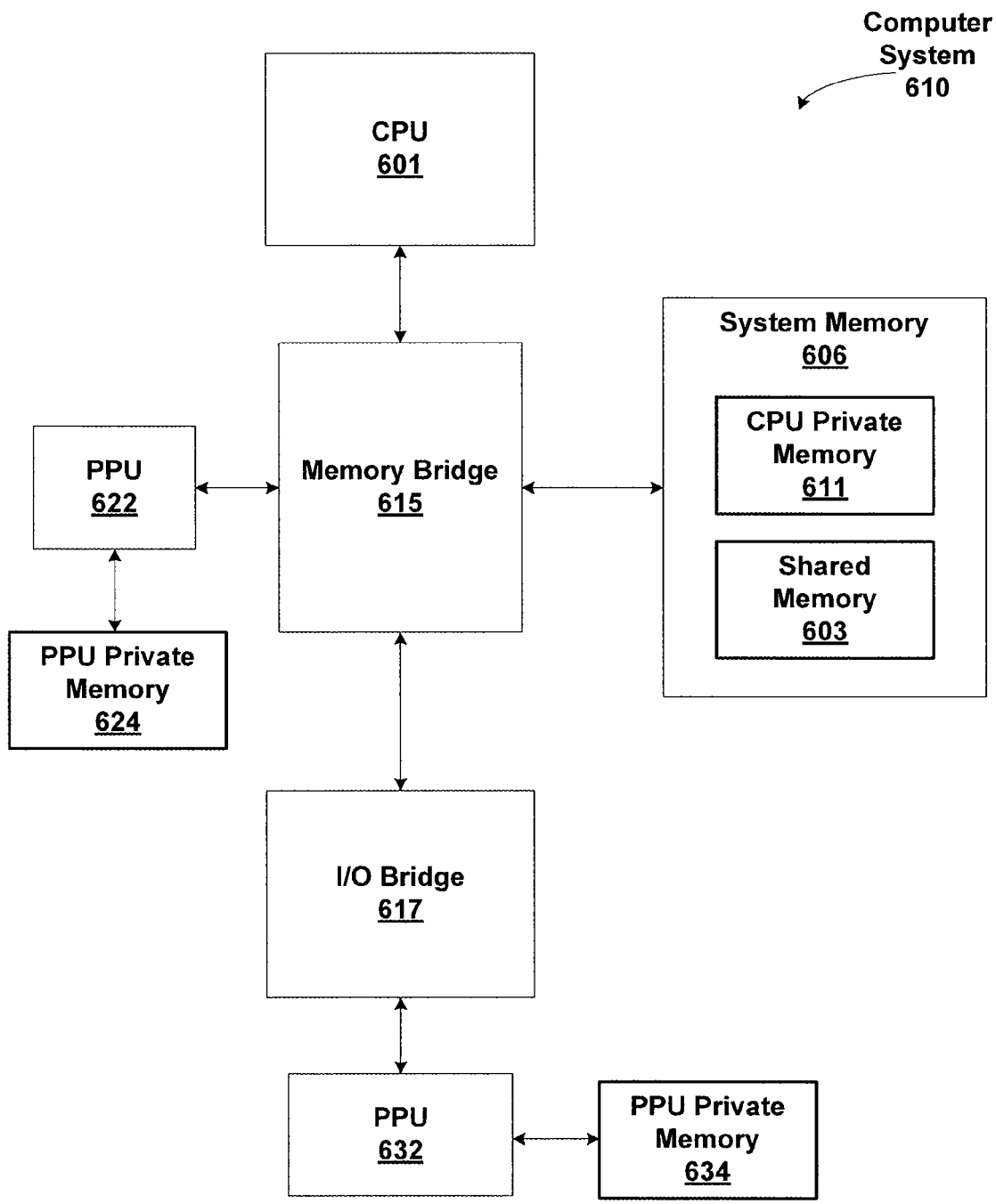

FIG. 6B is a block diagram illustrating a computer system 610 that includes the CPU 601 and system memory 606, and is configured to implement one or more aspects of the present invention. A PPU 622 is coupled to a memory bridge 615 and PPU 622 may be implemented as an add-in card that can be inserted into an expansion slot of computer system 610. A PPU private memory 624 is coupled to the PPU 622. Alternatively, or additionally, a PPU 632 is coupled to an I/O bridge 617 and may be implemented as an add-in card that can be inserted into an expansion slot of computer system 610. A PPU private memory 634 is coupled to the PPU 634. A first portion of the system memory 606, CPU private memory 611 may be explicitly allocated for use only by the CPU 601. In contrast with conventional systems, a second portion of system memory 606, shared memory 603, is explicitly allocated for shared use by CPU 601, PPU 622, and/or PPU 632.

Figure 6C:
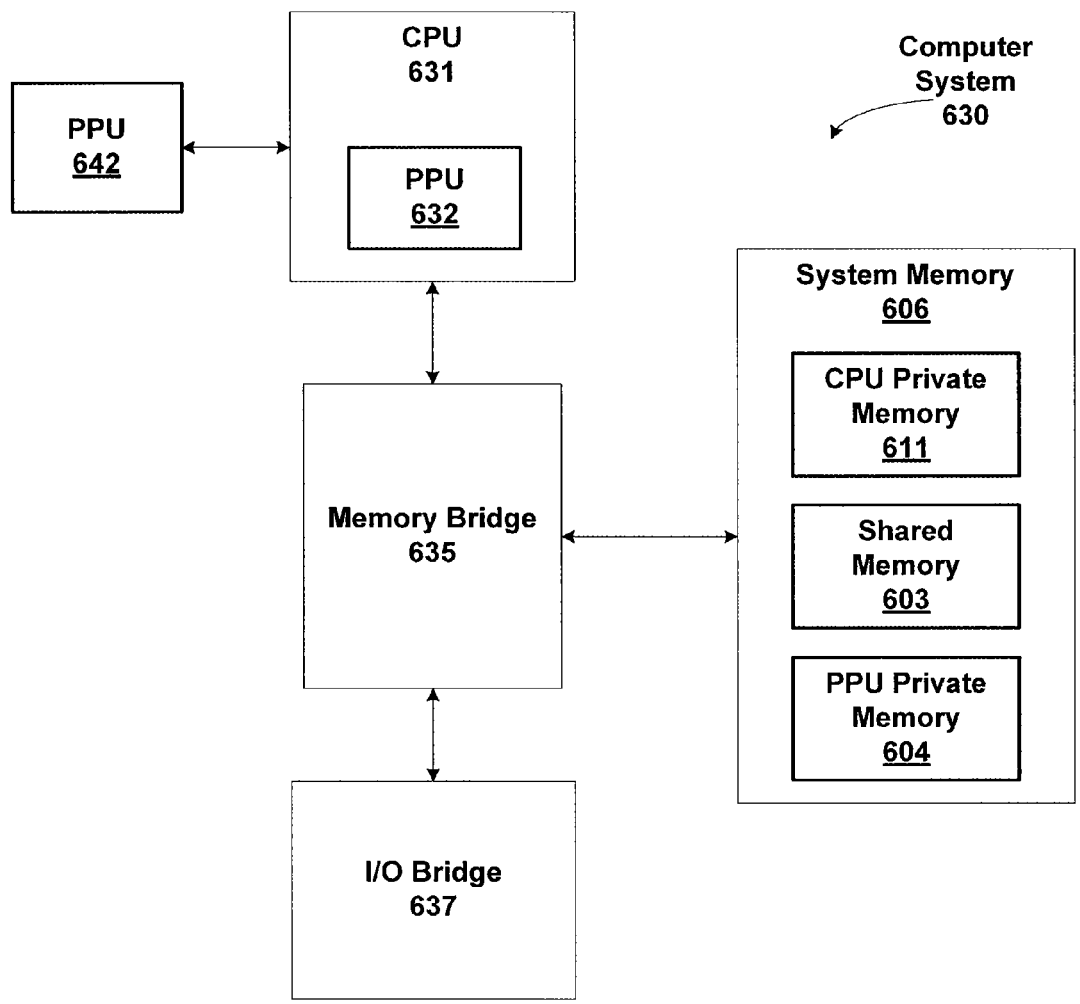

FIG. 6C is a block diagram illustrating a computer system 630 that includes a CPU 631, I/O bridge 637, memory bridge 635, and system memory 606, and is configured to implement one or more aspects of the present invention. A PPU 632 is integrated into the CPU 631. Alternatively, or additionally, a PPU 642 is coupled to the CPU 632. A first portion of a system memory 606, CPU private memory 611 may be explicitly allocated for use only by the CPU 631. A second portion of system memory 606, PPU private memory 604 may be explicitly allocated for use only by PPU 632 and/or PPU 642. In contrast with conventional systems, a third portion of system memory 606, shared memory 603, is explicitly allocated for shared use by CPU 631, PPU 632, and/or PPU 642.

Figure 6D:
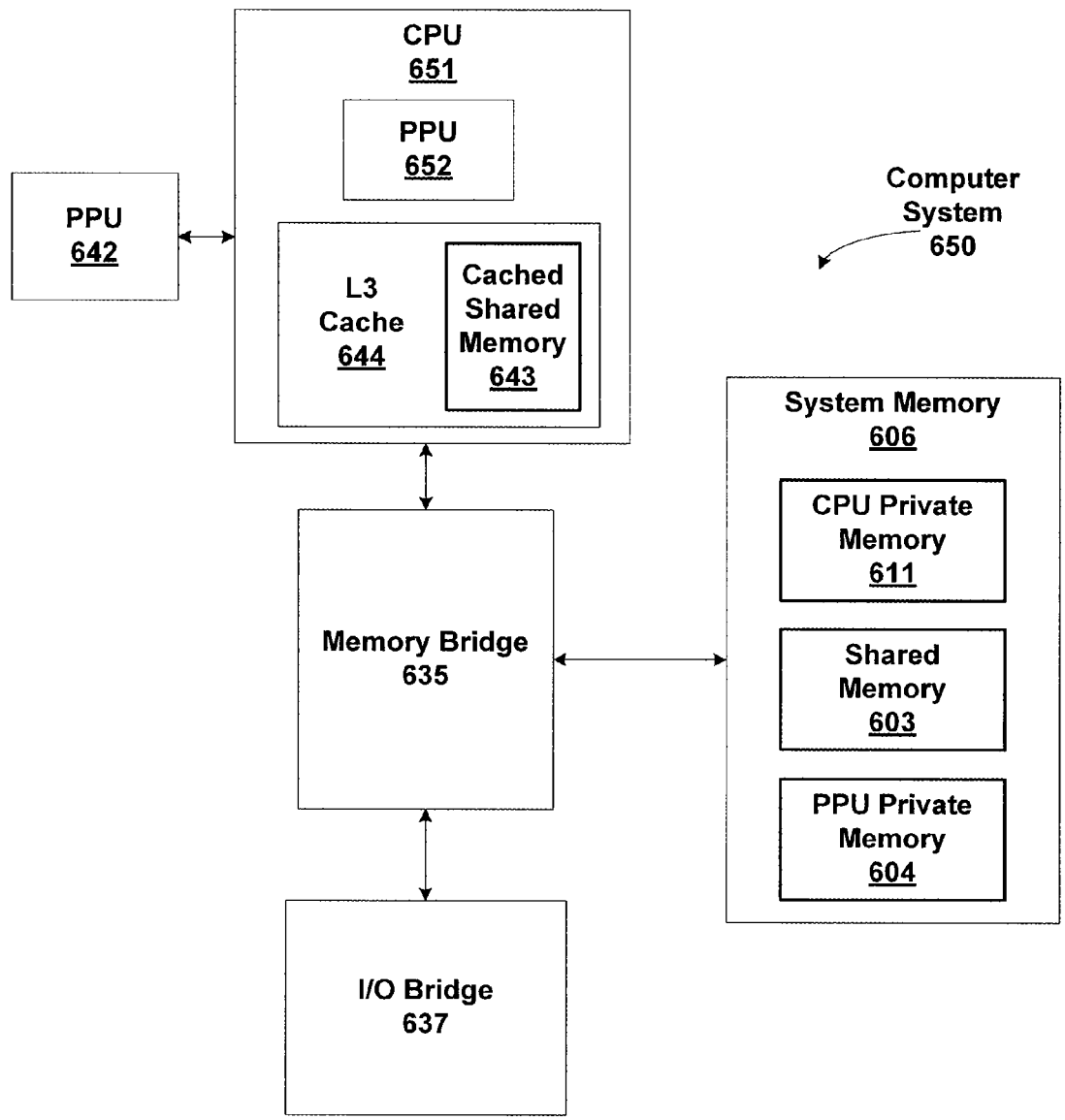

FIG. 6D is a block diagram illustrating a computer system 650 that includes a CPU 651, I/O bridge 637, memory bridge 635, and system memory 606, and is configured to implement one or more aspects of the present invention. A PPU 652 is integrated into the CPU 631. Alternatively, or additionally, the PPU 642 is coupled to the CPU 632. A first portion of a system memory 606, CPU private memory 611 may be explicitly allocated for use only by the CPU 651. A second portion of system memory 606, PPU private memory 604 may be explicitly allocated for use only by PPU 652 and/or PPU 642. In contrast with conventional systems, a third portion of system memory 606, shared memory 603, is explicitly allocated for shared use by CPU 631, PPU 652, and/or PPU 642.

When CPU 651 includes an L3 cache 644 a portion of the shared memory 603 may be stored in the L3 cache 644 as cached shared memory 643. CPU 651, PPU 652, and/or PPU 642 may read and write caches shared memory 643, reducing data transfers between through memory bridge 635 to shared memory 603. PPUs 632 and 652 are integrated into CPUs 631 and 651, respectively, and each include a virtual memory management unit that is separate from the CPU's address translation unit. Although FIGS. 6A, 6B, 6C, and 6D illustrate shared memory 603 within system memory 606, in embodiments of the invention that include other memory, such as PP memory 204, shared memory 603 may be allocated in a portion of the PP memory 204.

Figure 6E:
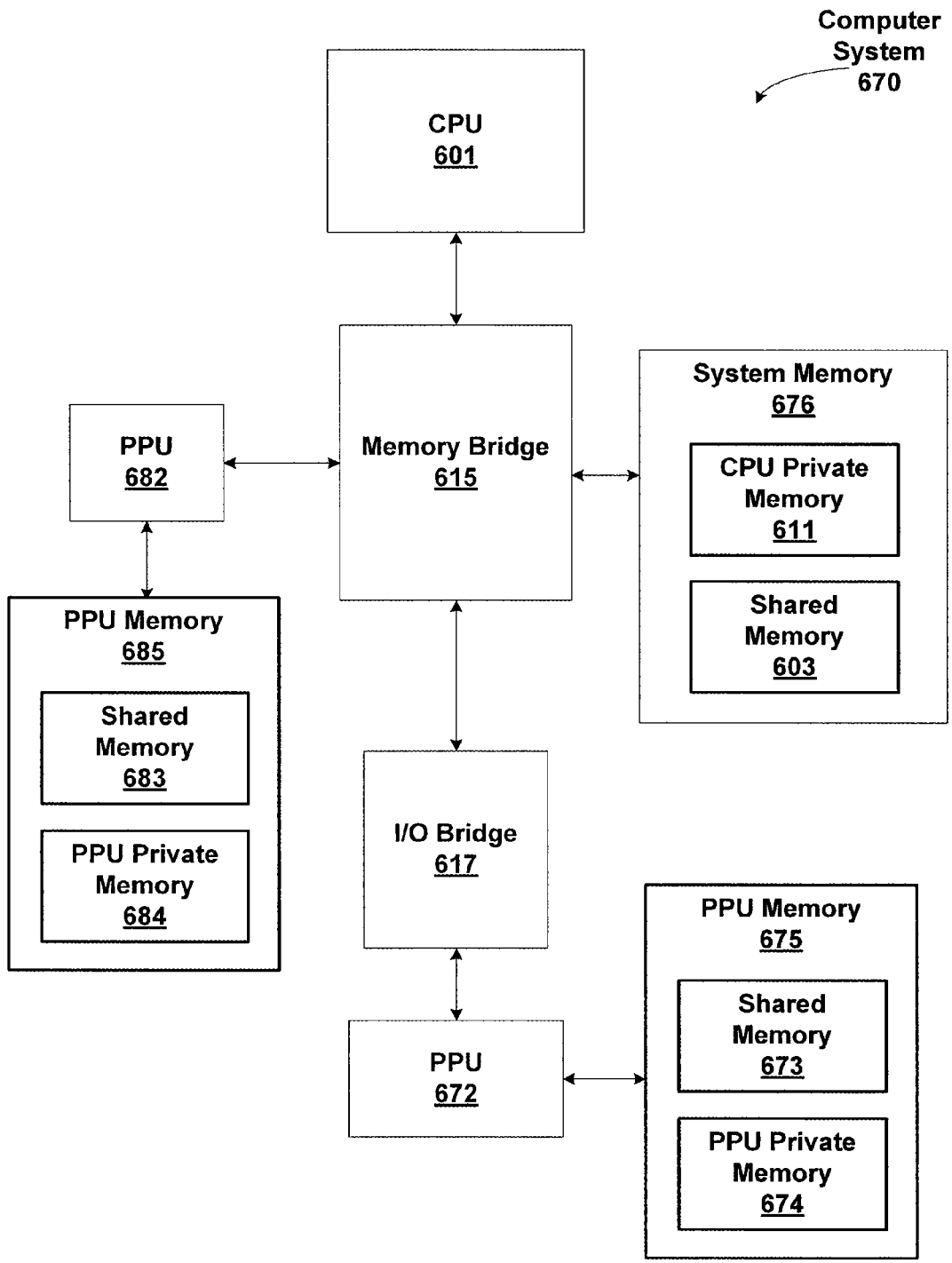

FIG. 6E is a block diagram illustrating a computer system 670 that includes the CPU 601 and system memory 676, and is configured to implement one or more aspects of the present invention. A PPU 682 is coupled to a memory bridge 615. PPU 682 is coupled to a PPU memory 685 and the combination may be implemented as an add-in card that can be inserted into an expansion slot of computer system 670. A PPU private memory 684 is allocated to the PPU 682 and a shared memory 683 is allocated for use by PPU 682 and CPU 601. Shared memory 683 may also be allocated for use by PPU 672. Alternatively, or additionally, a PPU 672 is coupled to an I/O bridge 617. PPU 672 is coupled to a PPU memory 675 and the combination may be implemented as an add-in card that can be inserted into an expansion slot of computer system 670. A PPU private memory 674 is allocated to the PPU 672 and a shared memory 673 is allocated for use by PPU 672 and CPU 601. Shared memory 673 may also be allocated for use by PPU 682. Additionally, the shared memory 603 is explicitly allocated for shared use by CPU 601, PPU 682, and a PPU 672. In contrast with conventional systems, shared memory 603, 683, and 673, are explicitly allocated for shared use by any combination of CPU 601, PPU 683, and/or PPU 673.

Persons skilled in the art will understand that the architecture described in FIGS. 1, 2, 3A, 3B, 3C, and 6A through 6E in no way limits the scope of the present invention and that the techniques taught herein may be implemented on any properly configured processing unit, including, without limitation, one or more CPUs, one or more multi-core CPUs, one or more PPUs, one or more multi-core PPUs, or the like, without departing the scope of the present invention.

In the code shown in TABLE 1 a developer uses conventional techniques, copying data between memory allocated to the CPU and memory allocated to the PPU. First a portion of memory is allocated for use by the CPU, the contents of the CPU private memory are initialized, and PPU private memory is allocated on the PPU (see the second through fourth lines in TABLE 1). The developer then copies the data from the CPU private memory to the PPU private memory and directs PPU to begin processing the data. When PPU finishes processing the data, the results are copied from the PPU private memory to the CPU private memory.

TABLE 1

```
int *ddata = NULL, *hdata = NULL;
hdata = (int*)malloc(sizeof(int)*N);
memset (hdata, 0, sizeof(int)*N);
cudaMalloc((void*)&ddata, sizeof(int)*N);
cudaMemcpy(ddata, hdata, sizeof(int)*N, cudaMemcpyHostToDevice);
GPUCompute<<<BLOCKS, THREADS>>>(ddata);
cudaMemcpy(hdata, ddata, sizeof(int)*N, cudaMemcpyDeviceToHost);
printf("Start: %i, Finish: %i", hdata[0], hdata[N-1])
```

Two new functions are added to the CUDA™ driver applications programming interface in order to alias system memory as PPU memory for access by a PPU. A first function takes a pointer p that points to pinned system memory and aliases the pointer to PPU memory space with CUdeviceptr *pret. A final variable, an unsigned integer named bytes, controls how much memory pointed to by the pointer p is mapped to pret. An example format for the first function, cuMemMapHost is:

cuMemMapHost(CUdeviceptr *pret, void *p, unsigned int bytes).

A second function may be used to break the mapping between dptr and the memory mapped via cuMemMapHost. A example format for the second function, cuMemUnmapHost is:

cuMemUnmapHost(CUdeviceptr dptr).

A developer may use the new functions to avoid the copy operations to change the code shown in TABLE 1 to use zero-copy data sharing, resulting in the code shown in TABLE 2. A first difference between the conventional code in TABLE 1 and the code that uses the new functions is that the developer allocates pinned host memory instead of standard paged host memory (see the second line of the code in TABLE 2). A second difference is that the memory copy operations are missing from the code in TABLE 2.

TABLE 2

```
int *ddata = NULL, *hdata = NULL;
cudaMallocHost(((void **) &hdata, sizeof(int)*N);
memset (hdata, 0, sizeof(int)*N);
cudaMemMapHost ( (CUdeviceptr*)&ddata, hdata, sizeof(int)*N)
GPUCompute<<<BLOCKS, THREADS>>>(ddata);
printf("Start: %i, Finish: %i", hdata[0], hdata[N-1])
```

Execution of an application subroutine or kernel using conventional copy techniques can be divided into three different phases: initialization, computation, and cleanup. The initialization phase begins at the execution of the kernel and includes the time spent for both the PPU buffer allocations and the copies of input data from the system memory to the PPU buffers in the PPU memory. The computation phase is performed by the PPU. The cleanup phase includes the copy of the output data from the PPU memory to the system memory and the following cleanup/destruction of any PPU buffers. When the zero-copy method of using shared memory is used, the initialization phase and cleanup phase are unnecessary. When the new functions are used to avoid the copy operations, a significant performance improvement is measured compared with executing a kernel using conventional methods that rely of the copying of data.

In sum, a technique for reducing copying of data between memory allocated to the CPU and a PPU coprocessor is disclosed. The system memory is aliased as PPU device memory to allow the PPU coprocessor and the CPU to share the same portion of memory. Either device may write and/or read the shared portion of memory to transfer data between the devices rather than copying data from a portion of memory that is only accessible by one device to a different portion of memory that is only accessible by the other device. Removal of the need for explicit CPU memory to PPU memory and PPU memory to CPU memory copies improves the performance of the application and reduces physical memory requirements for the application since one portion of memory is shared rather than having separate portions of memory allocated to the CPU and the PPU. Additionally, further performance benefits may be realized since the PPU buffers that are no longer used are not allocated and cleaned up.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for sharing a portion of a physical memory, the method comprising:
    allocating the portion of the physical memory as a shared memory that is configured for use by a first coprocessor and a second coprocessor, wherein the first coprocessor and the second coprocessor are asymmetric processors;
    allocating a second portion of the physical memory as a private memory that is configured for use only by the first coprocessor;
    allocating a portion of a dedicated physical memory that is directly coupled to the second coprocessor and not directly coupled to the first coprocessor as a second shared memory that is configured for use by the first coprocessor and the second coprocessor;
    preparing input data by an application program that is executed by the first coprocessor;
    storing the input data only in the shared memory;
    reading the input data from the shared memory by the second coprocessor;
    processing the input data by the second coprocessor to produce output data; and
    storing the output data in the shared memory.

2. The method of claim 1, further comprising the step of reading data stored in the second shared memory by the first coprocessor by transferring the data through the second coprocessor.

3. The method of claim 1, wherein the second coprocessor is configured to access the shared memory using a virtual memory address that maps to a memory subsystem that is coupled to the first coprocessor.

4. The method of claim 1, wherein the second coprocessor is configured to locate a page table entry based on one or more address bits included within the virtual memory address, wherein the page table entry includes a physical address and a physical location bit and the second coprocessor accesses a page of physical memory based on a state of the physical location bit.

5. The method of claim 4, wherein the physical location bit indicates whether the page of physical memory resides in system memory or in the dedicated physical memory.

6. The method of claim 1, wherein a subset of the shared memory is cached within the first coprocessor.

7. The method of claim 1, wherein the second coprocessor is configured to access the shared memory through the first coprocessor.

8. The method of claim 1, wherein the first coprocessor is a central processing unit and the second coprocessor is a parallel processing unit that is configured by the first coprocessor to function as an offload device.

9. A non-transitory computer-readable medium that includes instructions that, when executed by a first coprocessor, cause the first coprocessor to transfer data through a portion of a physical memory that is shared with a second coprocessor, by performing the steps of:

obtaining a pointer that points to a pinned portion of system memory that can be accessed by the first coprocessor;

mapping the pointer to a dedicated memory to alias the pinned portion of the system memory as the dedicated memory and allow the first coprocessor to access the pinned portion of the system memory as a shared memory, wherein the dedicated memory is directly coupled to the second coprocessor and is not directly coupled to the first coprocessor;

writing input data to the shared memory by the first coprocessor; and reading the input data from the shared memory by the second coprocessor.

10. The non-transitory computer-readable medium of claim 9, wherein a variable controls the amount of the system memory that is associated with the pointer.

11. The non-transitory computer-readable medium of claim 9, further comprising breaking the mapping between the pointer and the dedicated memory to disallow accesses of the second coprocessor to the shared memory.

12. The non-transitory computer-readable medium of claim 9, wherein the second coprocessor is configured to access the shared memory using a virtual memory address that maps to the pinned portion of the system memory.

13. A computing device configured to share a portion of a physical memory, the computing device comprising:

the physical memory that includes a first portion of memory, in a pinned area of the physical memory, configured as a shared memory for use by a central processing unit and a parallel processing unit;

a dedicated physical memory that is directly coupled to the parallel processing unit and that is not directly coupled to the central processing unit that includes a third portion of memory configured as a second shared memory for use by the central processing unit and the parallel processing unit;

the central processing unit that is configured to:
allocate a second portion of the physical memory as a private memory for use only by the central processing unit;
execute an application program to prepare input data; and
store the input data only in the shared memory; and the parallel processing unit that is configured to:
read the input data from the shared memory;
process the input data to produce output data; and
store the output data in the shared memory.

14. The computing device of claim 13, wherein the central processing unit is further configured to read data stored in the second shared memory by transferring the data through the parallel processing unit.

15. The computing device of claim 13, wherein the parallel processing unit is further configured to access the shared memory using a virtual memory address that maps to the physical memory.

16. The computing device of claim 13, wherein the parallel processing unit is further configured to locate a page table entry based on one or more address bits included within the virtual memory address, wherein the page table entry includes a physical address and a physical location bit and the parallel processing unit accesses a page of physical memory based on a state of the physical location bit.

17. The computing device of claim 16, wherein the physical location bit indicates whether the page of physical memory resides in system memory or in the dedicated physical memory.

18. The computing device of claim 13, wherein the central processing unit is further configured to store a subset of the shared memory in a cache and the parallel processing unit is configured to access the cache.

19. The computing device of claim 13, wherein the central processing unit is further configured to read the output data from the shared memory.

20. The computing device of claim 13, further comprising a bridge device that is coupled between the central processing unit and the physical memory, wherein the parallel processing unit is disposed within the bridge device.

* * * * *